US005188209A

United States Patent [19]

Johnson et al.

[11] Patent Number: 5,188,209

[45] Date of Patent: Feb. 23, 1993

[54] HANDRAIL ROLLER BOW ADJUSTMENT

[75] Inventors: Gerald E. Johnson, Farmington; James A. Rivera, Bristol, both of Conn.; Arthur McClement, Bloomington, Ind.

[73] Assignee: Otis Elevator Company, Farmington, Conn.

[21] Appl. No.: 918,303

[22] Filed: Jul. 21, 1992

[51] Int. Cl.[5] .............................................. B65G 15/00

[52] U.S. Cl. .................................................. 198/336

[58] Field of Search ................................ 198/336, 335

[56] References Cited

U.S. PATENT DOCUMENTS

| | | | |
|---|---|---|---|
| 2,071,813 | 2/1937 | Bouton et al. | 198/336 |
| 2,660,286 | 11/1953 | Margles | 198/336 |
| 2,885,057 | 5/1959 | Hansen | 198/336 X |
| 3,621,970 | 11/1971 | Johnson | 198/336 |

*Primary Examiner*—D. Glenn Dayoan
*Assistant Examiner*—Cheryl L. Gastineau
*Attorney, Agent, or Firm*—William W. Jones

[57] ABSTRACT

The moving handrail on an escalator or moving walkway is first tightened on its guide rail to the extent necessary to eliminate substantially all handrail slack in the handrail loop. Thereafter, the handrail is loosened so as to impart optimum slack thereto whereby handrail friction and heat is minimized during operation of the escalator or moving walkway.

7 Claims, 3 Drawing Sheets

HANDRAIL ROLLER BOW ADJUSTMENT

TECHNICAL FIELD

This invention relates to the adjustment of handrail tension in a moving handrail system in an escalator or moving walkway. More particularly, this invention relates to the provisions of an optimum amount of slack in the handrail so as to enable operation of the handrail with minimum friction generation.

BACKGROUND OF THE INVENTION

Escalator and moving walkway handrails travel over a continuous path which is defined by handrail guides both above and below the balustrades of the conveyor and on both the entry and exit landing balustrade newels. The handrails are typically powered by some sort of nip-type drive or other form of traction, wherein the handrail continuously moves through a drive nip which may be formed by opposed roller sets, opposed belt sets, or a combination of rollers and belt, or around a traction roller. U.S. Pat. 2,660,286 granted Nov. 24, 1953 to S. G. Mayes illustrates the latter type of drive. In moving handrail systems, there is an inherent problem relating to handrail tension, in that sufficient tension must be maintained to keep the handrail movement smooth and to keep the drive nip pressure at an optimum level, while at the same time, sufficient handrail slack must be maintained to hold system friction down to acceptable levels. In escalator and moving walkway systems which are assembled in the field, the achievement of an optimum tension/slack condition in the handrails is largely the result of guesswork. Readjustment of the handrail after servicing, replacement or repairs of any part of the handrail system in the field is also an inexact procedure.

DISCLOSURE OF INVENTION

This invention relates to the adjustment of escalator or moving walkway tension to provide an optimum tension/slack balance for handrail operating performance. More particularly, this invention relates to a device which is mounted on the escalator or walkway truss, which can be used to produce an optimum and repeatable handrail tension/slack balance in the factory and in the field. The system of this invention includes a handrail tensioning device, such as a roller bow, which is adjustable and which can be manipulated to produce the optimum handrail tension/slack balance for the system. The device is first adjusted to tension the handrail so as to remove substantially all of the slack therefrom. The slack-free state is calibrated on the device so that the device will indicate to the assembler or mechanic when the slack-free state is reached. This calibration is the result of empirical testing performed at the factory, and is not dependent on the length of the escalator or walkway. The device is then manipulated to lower the handrail tension until the optimum amount of handrail slack is reached. The optimum slack condition is also calibrated on the device and is also determined empirically at the factory. Once the optimum slack condition is achieved, the device will be operable to maintain the same setting during subsequent operation of the escalator or walkway.

It is therefore an object of this invention to provide a moving handrail adjustment system which will impart optimum operating slack to the handrail.

It is an additional object of this invention to provide an adjustment system which is precalibrated from empirical data and can be used properly without special training.

It is a further object of this invention to provide an adjustment system of the character described which is a permanent component of the escalator or walkway.

BRIEF DESCRIPTION OF THE DRAWINGS

These and other objects and advantages of the invention will become more readily apparent from the following detailed description of a preferred embodiment thereof when taken in conjunction with the accompanying drawings, which.

BEST MODE EMBODIMENT OF THE INVENTION

Figure 1:
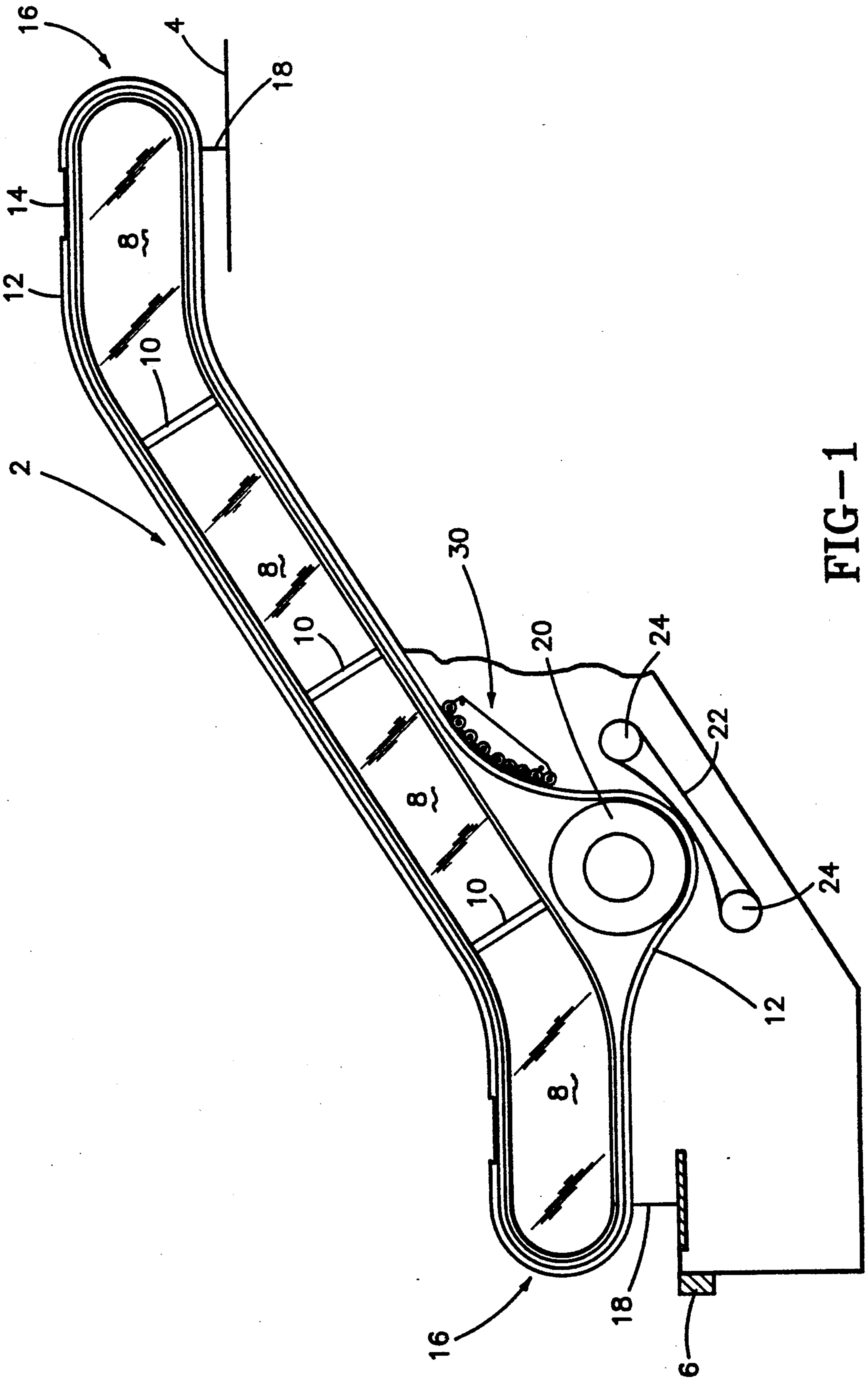
FIG. 1 is a side elevational view of an escalator showing the path of travel of the handrail thereon.

Referring to FIG. 1, there is shown a somewhat schematic illustration of an escalator which is denoted generally by the numeral 2. The escalator 2 has upper and lower landings 4 and 6 respectively, and a plurality of balustrade panels 8 separated by balustrade posts 10. A moving handrail 12 is mounted on a guide rail or track 14 which is mounted on the balustrade panels 8, the latter of which are typically made from glass in the more modern escalators. The handrail 12 moves along the top of the balustrades 8, around landing newels 16, and through skirt openings 18 to an area beneath the escalator treads where the escalator truss is disposed. The area beneath the treads defines the return path of the handrail and is where the handrail drive is located. The handrail drive will typically include a handrail-engaging drive wheel 20 which engages the underneath, or inner surface of the handrail 12. A backup belt 22 mounted on idlers 24 will typically be used to press the handrail 12 against the drive wheel 20. The drive wheel 20 will typically be connected to and powered by the main drive motor, which is an electric motor. The handrail tensioning device is indicated generally by the numeral 30.

Figure 2:
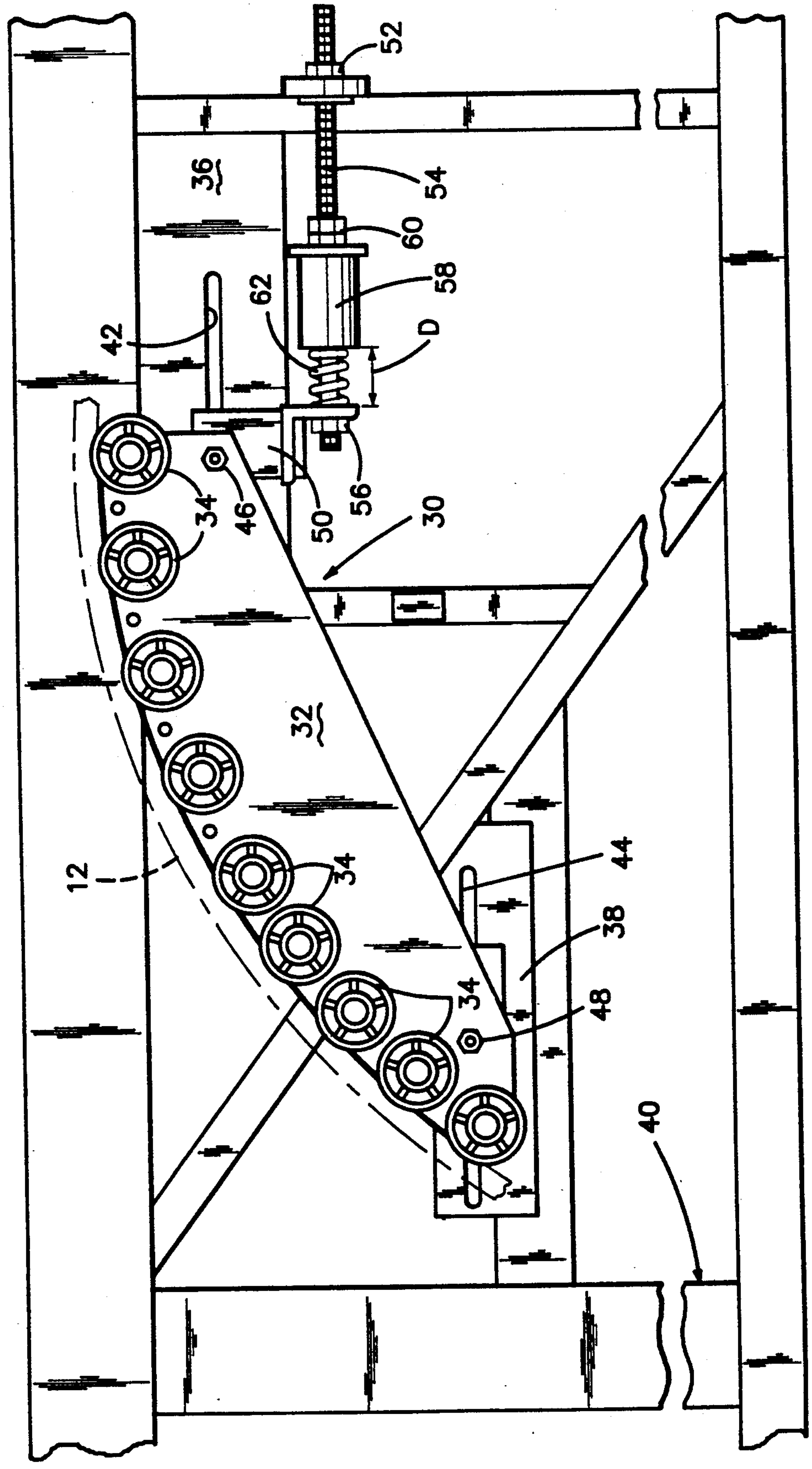
FIG. 2 is a side elevational view of the handrail tension adjusting device on the truss of the escalator with the device being shown in its slackless position.
Figure 3:
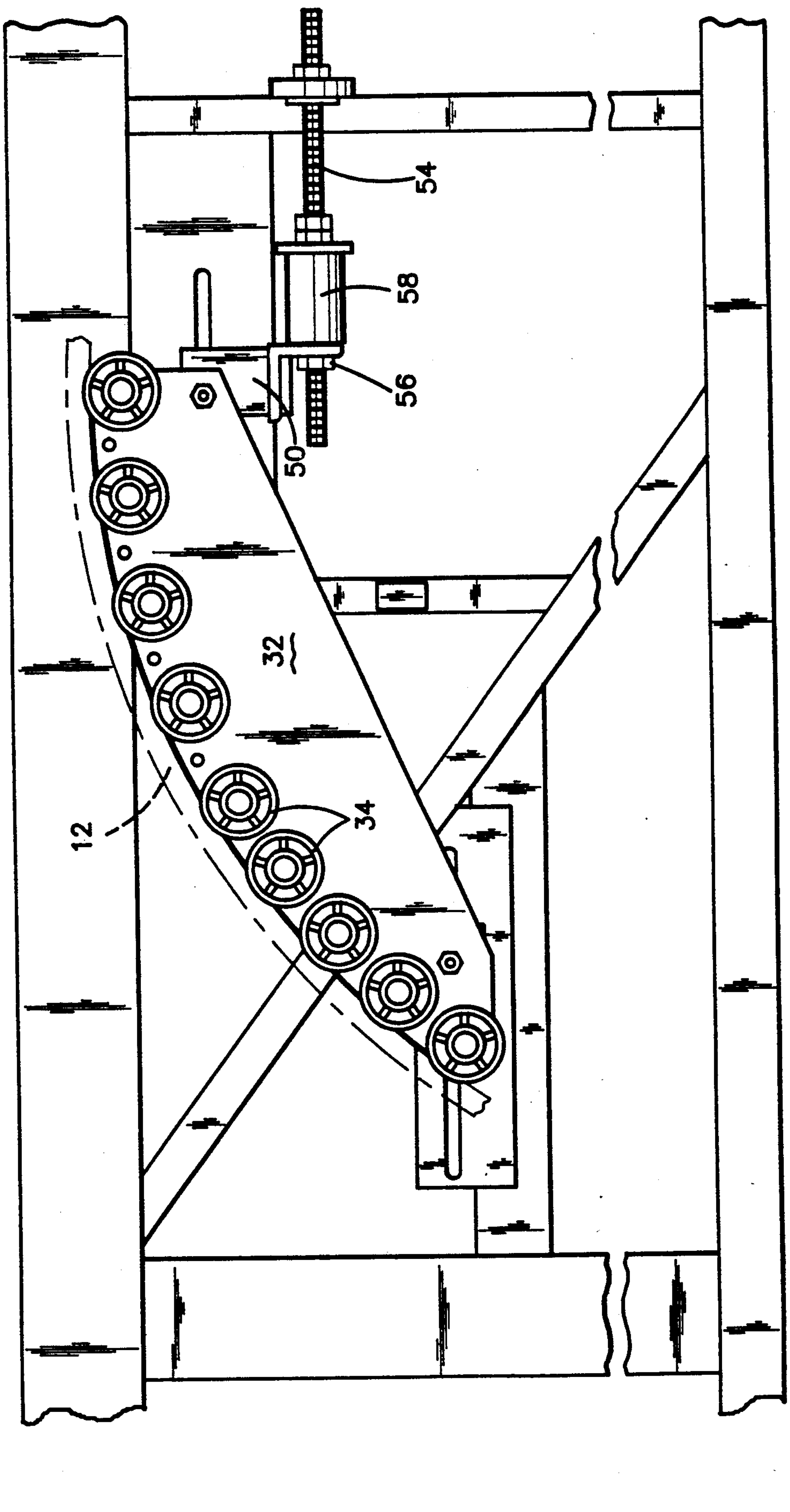
FIG. 3 is a side elevational view similar to FIG. 2 but showing the tension adjusting device in its optimum slack position.

FIGS. 2 and 3 show details of the tensioning device 30. The device 30 includes a bow plate 32 on which are journaled a plurality of handrail guide rollers 34. The guide rollers 34 form a curved path of travel for the handrail 12 (shown in phantom). A pair of guide plates 36 and 38 are mounted on the escalator truss 40. Each guide plate 36 and 38 includes a horizontally elongated slot 42 and 44 respectively in which pins 46 and 48 mounted on the bow plate 32 are slidably disposed. The plate 32 and rollers 34 can thus move to the left and right along the truss 40. A first bracket 50 is mounted on the bow plate 32 adjacent to the pin 46. A second bracket 52 is mounted on the truss 40 opposite first bracket 50. A threaded rod 54 is fixed to the bracket 52 and extends through the bracket 50, but is not fixed to the latter. An adjustment nut 56 is mounted on the rod 54 and bears against the bracket 50. A cup 58 is fixed to the rod 54 by means of nuts 60, and the cup 58 contains a spring 62 which is mounted on the rod 54. The spring 62 is sandwiched between the cup 58 and the bracket 50 and serves as a connection between the two elements.

The assembly is adjusted so as to remove all of the slack in the handrail 12 by rotating the nuts 60 on the rod 54 so as to advance the cup toward the bracket 50. This jacking movement of the cup 58 causes the spring 62 to move the bow plate 32 and rollers 34 to the left in FIG. 2 so as to tighten the handrail 12. When the gap between the cup 58 and the bracket 50 reaches a predetermined empirical size D, the adjuster will know that the handrail 12 has been tightened to the degree necessary to remove all of the slack from the handrail loop.

At that point, the adjuster tightens the adjustment nut 56 onto the rod 54 so as to compress the spring 62 sufficiently to move the bracket 50 toward and against the cup 58, as shown in FIG. 3. This adjustment pulls the bow plate 32 and rollers 34 back to the right, as seen in FIGS. 2 and 3, so as to reinsert a predetermined amount of slack into the handrail 12. The slack imparted to the handrail 12 by the adjustment will be proportional to the distance D and will be empirically calculated to be the optimum slack for operating the handrail 12. Once these optimum conditions are determined, field personnel will consistently be able to make the necessary adjustments to the handrail in the field without having to guesstimate the amount of slack that is imparted to the handrail. In a system using a spring, many different spring configurations can be used. The need is for the spring to impart a force of approximately 100 lb. to remove the handrail slack. The spring must also then have the capability to compress the distance after imposing the 100 lb force. The distance D has been calculated as being between 35 and 40 mm.

It will be appreciated that the adjustment system of this invention will allow field personnel to install, service, and repair escalators and their handrail assemblies, while enabling them to adjust or readjust the handrail when finished to impart optimum handrail operating slack to the handrail. The only information needed is to know the value of the gap distance D, which is empirically calculated at the factory and communicated with field personnel. An adjusting device that "pulls" rather than "pushes" the bow plate can also be used to practice the invention.

Since many changes and variations of the disclosed embodiment of the invention may be made without departing from the inventive concept, it is not intended to limit the invention otherwise than as required by the appended claims.

What is claimed is:

1. An escalator or moving walkway assembly comprising:

a) a truss;

b) means mounted on said truss for defining a closed loop path of travel for a moving handrail;

c) a handrail mounted on said means for defining;

d) handrail tensioning means mounted on said truss and engaging said handrail;

e) first adjustment means for moving said tensioning means against said handrail so as to remove substantially all handrail slack from the closed loop, said first adjustment means forming a first sensible indication of a slack-free handrail condition; and f) complementary adjustment means for moving said tensioning means to a preferred handrail-slackened position, said complementary adjustment means being operable to form a second sensible indication of a preferred handrail slackened condition wherein optimal friction is created by movement of said handrail along said closed loop path of travel.

2. The assembly of claim 1, wherein said first adjustment means comprises a spring for biasing said tensioning means against said handrail; and first jacking means for moving said spring against said tensioning means to move said tensioning means relative to the truss, and to compress said spring to a degree which creates said first sensible indication.

3. The assembly of claim 2, wherein said complementary adjustment means comprises second jacking means acting in opposition to said first jacking means, said second jacking means being operable to move said tensioning means relative to the truss to impart slack to the handrail and to compress said spring further to a degree which creates said second sensible indication.

4. In an escalator or moving walkway assembly of the type comprising a truss and a moving handrail moving along a closed loop path of travel over a handrail guiding and driving system, a handrail tension adjustment assembly comprising:

a) a plate mounted on said truss for reciprocal sliding movement relative to said truss;

b) a plurality of guide rollers mounted on said plate, said guide rollers contacting said handrail to guide movement of the latter;

c) first jacking means mounted on said truss and engaging said plate, said first jacking means being operable to move said plate and said guide rollers in a handrail-tightening direction to a slack-free position to render said handrail substantially slack-free throughout said loop; and d) second jacking means connected to said truss and operable to move said plate and said guide rollers from said slack-free position in an opposite handrail-slackening direction to impart to said handrail a predetermined optimal degree of slack which allows said handrail to move over said guiding and driving system under optimal frictional conditions.

5. The assembly of claim 4, wherein said first jacking means comprises a spring means which engages said plate, said spring means being operable to compress to a first predetermined degree when said handrail is in its slack-free condition so as to provide a first sensible indication of achievement of said slack-free condition.

6. The assembly of claim 5, wherein said second jacking means is operable to further compress said spring to a second predetermined degree to provide a second sensible indication of achievement of said optimal degree of slack.

7. A method for adjusting tension in a closed loop escalator handrail to provide an optimal frictional operating state in the handrail, said method comprising the steps of:

a) providing a movable handrail guiding assembly;

b) providing an adjustment assembly for providing controlled positioning of the guiding assembly, said adjustment assembly including a spring;

c) manipulating said adjustment assembly so as to move said guiding assembly in a first direction sufficiently to produce a predetermined first degree of compression of said spring which indicates that said handrail has reached a slack-free state; and d) manipulating said adjustment assembly further to move said guiding assembly in a second direction opposite to said first direction sufficiently to produce a predetermined second degree of further compression of said spring which indicates that said handrail has reached said optimal frictional operating state.

* * * * *